United States Patent Office 3,679,640
Patented July 25, 1972

3,679,640
METHOD FOR MAKING HYDRAZINE DERIVATIVES OF COPOLYMERS OF VINYL AROMATIC COMPOUNDS AND α,β-UNSATURATED DICARBOXYLIC ACIDS OR ANHYDRIDES
Eugene R. Moore and William R. R. Park, Midland, Mich., assignors to The Dow Chemical Company, Midland, Mich.
No Drawing. Continuation-in-part of application Ser. No. 583,435, Sept. 30, 1966. This application Sept. 25, 1969, Ser. No. 861,167
Int. Cl. C08f 27/08
U.S. Cl. 260—78.5 T
4 Claims

ABSTRACT OF THE DISCLOSURE

The invention concerns a method for making hydrazine derivatives of resinous copolymers of monovinyl aromatic compounds and α,β-monoethylenically unsaturated dicarboxylic acids or their anhydrides.

---

This application is a continuation-in-part application of our prior application Ser. No. 583,435 filed Sept. 30, 1966, now abandoned.

This invention relates to a method for making water-insoluble thermoplastic resins having improved resistance to high temperatures and solvents. More particularly, this invention relates to a method for making hydrazine derivatives of copolymers of monovinyl aromatic unsaturated dicarboxylic acids or anhydrides such as maleic anhydride.

Thermoplastic resins such as a styrene-maleic anhydride copolymer have widespread utility in the fabrication of numerous articles owing to their ease of molding and shaping at elevated temperatures. They are also well adapted to the manufacture of foamed plastic articles because they can be heated and mixed with a blowing agent without a loss of their thermoplastic properties necessary for subsequent foaming. An important limitation in the use of thermoplastic resins can be attributed largely to their poor resistance to many organic solvents, and their tendency to soften at elevated temperatures.

According to our invention, a thermoplastic resin having improved resistance to solvents and high temperatures can be prepared by a method which comprises treating a copolymer of a monovinyl aromatic compound and an α,β-monoethylenically unsaturated dicarboxylic acid or acid anhydride, with hydrazine or a mono-substituted hydrazine to form a hydrazine derivative of the copolymer. Among the derivatives of hydrazine or a mono-substituted hydrazine to be employed are the hydrazides and hydrazinium salts.

Copolymer of styrene and maleic anhydride are particularly suitable for use in the practice of this invention. Copolymers containing from 4 to 32 mole percent and preferably from 8 to 20 mole percent maleic anhydride and correspondingly from 96 to 68, preferably from 92 to 80 mole percent styrene, have great utility as thermoplastic molding resins, the upper value being limited by increased water sensitivity and loss of thermoplasticity, the lower value being limited by the amount of maleic anhydride necessary to give significant increase in the solvent resistance and the heat distortion properties of the product. Most advantageously, the copolymers are homogeneous, or essentially homogeneous.

In addition to the styrene-maleic anhydride copolymer, other monovinyl aromatic compounds and α,β-monoethylenically unsaturated dicarboxylic acids or acid anhydrides may be used in preparing the thermoplastic copolymer employed in the practice of the invention. Suitable monovinyl aromatic compounds are vinyltoluene, vinylxylene, isopropylstyrene, chlorostyrene, dichlorostyrene, or tert.-butylstyrene. Additionally, the copolymer may be produced from a mixture containing two or more of said monovinyl aromatic compounds. Among acids or acid anhydrides which may be used in addition to maleic anhydride are maleic, chloromaleic, itaconic and citraconic acid, as well as chloromaleic, itaconic, and citraconic anhydrides. The anhydrides are preferred.

In preparing the hydrazine derivatives of the copolymer according to the invention, hydrazine or a mono-substituted hydrazine may be used. Mono-substituted hydrazines include the mono-alkyl, monoaralkyl and mono-aryl hydrazines, e.g., phenyl hydrazine, benzyl hydrazine, methyl and ethyl hydrazines, and monoacyl hydrazines, e.g., mono-acetyl hydrazine and semicarbazide.

According to our invention, the hydrazine derivatives are prepared by reacting hydrazine or a mono-substituted hydrazine with the copolymer of a monovinyl aromatic compound and an α,β-monoethylenically unsaturated dicarboxylic acid or acid anhydride.

From about 0.5 to about 1.5 moles of hydrazine or mono-substituted hydrazine per mole of dibasic acid or acid anhydride in the copolymer should be utilized in the practice of the invention.

The reaction to form a hydrazine derivative can be carried out at a temperature between about room temperature and about 250° C., the upper temperature corresponding substantially to the temperature of incipient decomposition of the copolymer. Further, the reaction can be carried out at a pressure corresponding substantially to the vapor pressure of the reaction mixture, or at subatmospheric, atmospheric, or superatmospheric pressure. Mechanical agitation may be used to speed the reaction, but is not necessary.

In practice, there are several procedures which may be used to carry out the aforementioned reaction. Hydrazine or mono-substituted hydrazine or a solution thereof may be added, with or without agitation, to a solution of the copolymer to be made into a hydrazine derivative, the resulting product then being devolatilized to remove the solvent and the water of reaction. In an alternative procedure the solution of the copolymer may be devolatilized prior to introducing the hydrazine. In still another alternative procedure, a solution of hydrazine or mono-substituted hydrazine can be introduced into an extruder containing the solid copolymer, the product thereafter being devolatilized to remove the water of reaction. In yet another alternative procedure, the copolymer, either solid or foamed, may be exposed to the action of hydrazine vapors.

The following examples serve to illustrate our invention. However, it is to be understood that our invention is in no way limited by these examples.

EXAMPLE I

A sample of a 90 mole percent styrene-10 mole percent maleic anhydride (MA) copolymer foam was exposed to hydrazine vapors at room temperature for about three days by placing the sample in a desiccator over a 67 percent aqueous solution of hydrazine.

The treated sample, i.e., the hydrazine derivative, was insoluble in water, methyl ethyl ketone (MEK) or tetrahydrofuran (THF) after 24 hours. An untreated sample of the foam dissolved in MEK or THF in a few seconds.

EXAMPLE II

Approximately 5 pounds of a styrene-maleic anhydride (85 mole percent styrene-15 mole percent MA) copolymer was placed in a glass bottle. One mole of hydrazine was added as a 67 percent solution in water per mole of maleic anhydride in the copolymer. This bottle was sealed and allowed to set for several weeks.

At the end of this time, the treated sample was insoluble after 24 hours in water, MEK or dimethyl formamide (DMF), while an untreated sample quickly dissolved in MEK or DMF.

The treated sample or hydrazine derivative was placed on a two roll mill at about 160° C. for 10 minutes to remove any unreacted hydrazine, after which it could still be formed by compression molding. The resulting treated sample had a Vicat heat distortion temperature of 148.6° C. compared with 127° C. for the untreated sample. Analysis for nitrogen in the milled sample indicated that 81 percent of the available carboxyl groups had been reacted with the hydrazine.

EXAMPLE III 200 grams of an 83.9 mole percent styrene-16.1 mole percent maleic anhydride copolymer, the viscosity of a 10 weight percent solution in MEK at 25° C. being 0.58 cps., was dissolved in 200 grams of toluene. 10.45 grams of hydrazine was added with agitation over a period of 5 minutes (a ratio of about one mole of hydrazine per mole of maleic anhydride). The product was recovered and devolatilized at 60° C. for 24 hours under vacuum.

The resulting product-hydrazine derivative-contained 5.82 percent oxygen and 4.48 percent nitrogen as determined by Neutron Activation analysis. The viscosity of a 10 percent solution in MEK at 25° C. was 1.00 cps. Interestingly, this product was found to be active in killing dog hookworms, mouse trichostrongylid, mouse pinworms, pig ascarids, and mouse tapeworms.

EXAMPLE IV

The same procedure as in Example III was followed except for adding 35.45 grams of phenylhydrazine instead of hydrazine (for a ratio of one mole of the phenylhydrazine per mole of maleic anhydride).

The devolatilized product had a viscosity of a 10 percent solution in MEK at 25° C. of 0.64 cp. and contained 7.14 percent oxygen and 3.84 percent nitrogen as determined by Neutron Activation analysis. This product also demonstrated the same activity as the product in Example III.

EXAMPLE V

In a manner similar to Example II, a styrene-maleic anhydride (15 mole percent) copolymer is exposed to hydrazine.

A sample of this treated copolymer (hydrazine derivative) is fed to a plastics extruder wherein it is heated to a temperature of about 250° C., then is extruded at a rate of 11 pounds per hour. The extruder was equipped with a volatile port. A vacuum is applied to this port and condensate collected. The condensate is primarily water with some organic material including traces of hydrazine as indicated by a basic reaction of the condensate with litmus paper.

The extruded product-hydrazine derivative is thermoplastic and is found to contain 4.5 percent nitrogen and 5.1 percent oxygen. When the feed rate is slowed to 5 pounds per hour, the results remain essentially the same.

EXAMPLE VI

A styrene-maleic anhydride (85 mole percent styrene-15 mole percent MA) copolymer is extruded at a rate of 10 pounds per hour in a manner similar to that employed in Example V at a temperature of 250° C. An entrance port approximately one foot ahead of the volatile port is used to introduce a solution of hydrazine in water under pressure. Water is removed in a volatile port.

(a) Hydrazine is introduced at a rate of one-half mole of hydrazine per mole of maleic anhydride. The resulting hydrazine derivative product contains 2.1 percent by weight of nitrogen. The Vicat heat distortion temperature is 137° C. and the product is moldable and thermoplastic.

(b) Same as (a) except one mole of hydrazine per mole of maleic anhydride is added. The resulting hydrazine derivative product contains 4.5 percent nitrogen, has a Vicat heat distortion temperature of 149° C., and is thermoplastic.

(c) Same as (a) except 1.5 moles of hydrazine per mole of maleic anhydride is added. The resulting hydrazine derivative product contains 4.9 percent nitrogen, has a Vicat heat distortion temperature of 154° C., and is thermoformable. The volatile port condensate is found to contain much unreacted hydrazine.

EXAMPLE VII

A styrene-maleic anhydride (15 mole percent) copolymer is dissolved in ethyl benzene at 100° C. This heated solution is metered with a pump, into a small in-line mixer. A stream of hydrazine solution in water is also pumped into the mixer at a rate such that one mole of hydrazine is added per mole of maleic anhydride. The reaction takes place very rapidly and the product is continuously passed on through a heat exchanger and dropped into a vacuum chamber where the ethyl benzene and water are removed.

The resulting hydrazine derivative product contains 4.5 percent nitrogen, and has a Vicat heat distortion temperature of 148° C.

We claim:

1. A method for making thermoplastic hydrazine derivatives of a copolymer of 68 to 96 mole percent of a monovinyl aromatic compound and correspondingly from 32 to 4 mole percent of an $\alpha,\beta$-monoethylenically unsaturated dicarboxylic acid or acid anhydride which comprises treating said copolymer with from about 0.5 to about 1.5 moles of hydrazine or mono-substituted hydrazine per mole of acid or acid anhydride in said copolymer at reaction temperatures between about room temperature and about 250° C.

2. The method of claim 1, wherein the copolymer is dissolved in an organic solvent.

3. The method of claim 1, wherein the copolymer is a copolymer of from 96 to 68 mole percent styrene and from 4 to 32 mole percent of maleic anhydride.

4. The method of claim 1, wherein the copolymer is treated with phenylhydrazine.

References Cited

UNITED STATES PATENTS 2,764,570  9/1956  Kowolik et al. _____ 260—29.6
3,444,151  5/1969  Verdol et al. _____ 260—86.7

JOSEPH L. SCHOFER, Primary Examiner

J. KIGHT III, Assistant Examiner

U.S. Cl. X.R.

260—2.5 R, 32.8 N, DIG. 2